United States Patent Office 2,830,071
Patented Apr. 8, 1958

2,830,071

METHOD OF PRODUCING α-ACETYL PROPIONITRILE

Hideo Okeda, Kanji Taniguchi, Aritsune Kaji, and Kazuo Abe, Takaoka City, Japan, assignors to Nippon Soda Co. Ltd., Tokyo, Japan No Drawing. Application September 4, 1957
Serial No. 681,883

11 Claims. (Cl. 260—465.1)

The present invention relates to the production of α-acetylpropionitrile. This compound is useful intermediate for sulfisoxazole, which is valuable as a chemotherapeutical.

This application is a continuation-in-part of our copending application Serial No. 501,004, filed April 12, 1955, now abandoned.

Heretofore, two methods were reported in the literature for the production of α-acetylpropionitrile: According to one method, acetonitrile is converted to its dimer by Claisen's reaction, a methyl group is introduced by methyl iodide, and the imino group is hydrolysed to obtain the desired compound. (Journal für Praktische Chemie, (2) 90, 195–198 (1914).)

By another reported method, 3-chlorobutanone-(2), which was obtained by the chlorination of methylethylketone, is allowed to react with an alkali metal cyanide, such as sodium cyanide or potassium cyanide. This reaction may be carried out in absolute alcohol (Bulletin de la Société Chimique de France, (3), 6, 814 (1891)), or in aqueous medium (Chemisches Zentralblatt, 1900, 1, 1123; 1901, 1, 95).

The first method has little commercial value because of the high costs of starting material and because of the dangers accompanying the use of metallic sodium and benzene. On the other hand, the product obtained by the second method has a boiling point of either 156° C. or 145–146° C.; in either instance, this product is different from α-acetylpropionitrile which has a boiling point of 183° C. From later investigations of this second alleged method, it became clear that the product which had a boiling point of 156° C. was actually a mixture of α,β-dimethylglycidonitrile and a small quantity of α-acetylpropionitrile; the product which had a boiling point of 145–146° C. was α,β-dimethylglycidonitrile. In both cases, α-acetylpropionitrile was not obtained. (Gazzetta Chimica Italiana, Rome, 69, 378–91 (1939); Chemical Abstracts, 33, 8574 (1939).) In Beilstein, 4 Auflage, 2 Ergaenzung, 3, 433, this reaction is revised and formularized as follows:

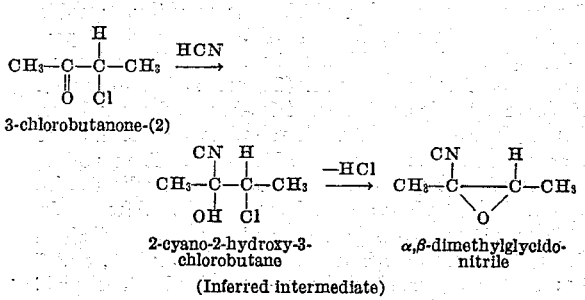

3-chlorobutanone-(2)

2-cyano-2-hydroxy-3-chlorobutane
(Inferred intermediate)

α,β-dimethylglycidonitrile

Therefore, it is a principal object of this invention to provide a satisfactory method for the production of α-acetylpropionitrile.

Other and further objects and advantageous features of this invention will hereinafter more fully appear from the following detailed description and from the various illustrative examples included herein.

In accordance with the present invention, low priced methylethylketone was used as one of the starting materials. It was found that α-acetylpropionitrile could be obtained by the following reactions in aqueous or alcoholic medium:

(a) The reaction of 3-chlorobutanone-(2) with alkali metal cyanide. (This ketone is obtained by chlorination of methyl-ethylketone.) The amount of cyanide used is in excess of theoretical amount.

(b) The reaction of α,β-dimethylglycidonitrile with alkali metal cyanide. (This nitrile is obtained by the reaction of 3-chlorobutanone-(2) with alkali metal cyanide.)

(c) The rearrangement of α,β-dimethylglycidonitrile by using the catalyst such as inorganic bases, organic bases and organic acids (using solvents or no solvent).

(d) The reaction of 2-cyano-2-hydroxy-3-chlorobutane with alkali metal cyanides. (This compound is easily derived from 3-chlorobutanone-(2) or α,β-dimethylglycidonitrile.)

As stated in the above mentioned literature (Gazzetta Chimica Italiana, Rome, 69, 378–91 (1939)), the compound obtained by the reaction of 3-chlorobutanone-(2) with alkali metal cyanide was actually α,β-dimethylglycidonitrile and not α-acetylpropionitrile, as originally hypothesized. Nevertheless it was discovered that α-acetylpropionitrile could be produced by a rearrangement of α,β-dimethylglycidonitrile providing that an excess of alkali metal cyanide is employed. This rearranging reaction is formularized as follows:

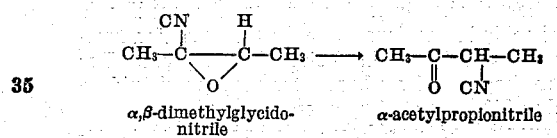

α,β-dimethylglycido-
nitrile

α-acetylpropionitrile

As a result of examining the above rearrangement, it was further found that other rearranging agents could be used in addition to the alkali metal cyanides; these other rearranging agents include inorganic bases such as hydroxides of alkali metals or alkaline earth metals, alkali carbonates, metal cyanides, organic bases such as pyridine, metal alcoholates, and organic acids such as acetic acid. According to further search on the mechanism of this rearrangement, it became clear, first of all, that it was not the rearrangement of hydrogen, but that of the cyano radical, based upon the observation that the compound obtained by the similar reaction from α-ethyl-β-methylglycidonitrile which is an analogous compound to α,β-dimethylglycidonitrile was α-propionoylpropionitrile. This is formularized as follows:

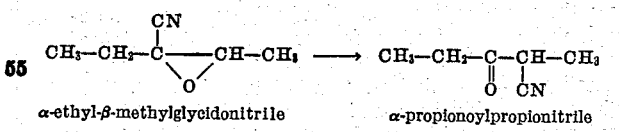

α-ethyl-β-methylglycidonitrile

α-propionoylpropionitrile

Further, as a result of tracing the rearrangement of the cyano radical using radioactive isotopes, it became clear that, when the reaction was effected with alkali metal cyanide, the dicyano-compound was formed as an intermediate in the following reactions:

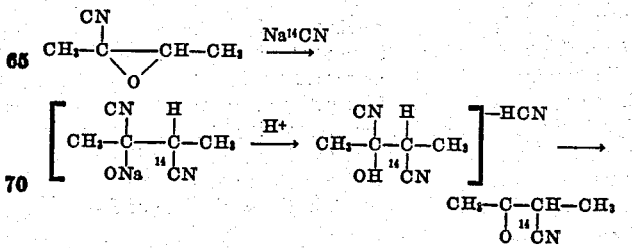

But in case rearranging catalysts other than alkali metal cyanides are used, it is not yet clear whether the cyano radical attaches directly to the adjacent carbon atom or indirectly, i. e., whether the cyano radical separates during the reaction followed by its later addition to $\alpha,\beta$-dimethylglycidonitrile, then forming the dicyano-compound.

As condition of reaction of 3-chlorobutanone-(2) with cyanide in aqueous solution, low temperature requires a long reaction time while a high temperature requires a correspondingly shorter time. For obtaining the best yield, the following relations of reaction temperature and reaction time are recommended:

| Reaction Temperature | Reaction Time |
| --- | --- |
| 35° C | 10 hours. |
| 45-50° C | 3-4 hours. |
| 65° C | 1-1.5 hours. |
| 80° C | 30-40 minutes. |
| 90-100° C | 5-15 minutes. |

Generally speaking, it seems that the reaction at high temperatures for a short time produces less resinform matter and is better in yield. When the reaction is effected in aqueous solution, benzene or other organic solvent, which is immiscible with water, may be added, and if necessary, an emulsifier may be added further. In such a case, the reaction conditions are similar to the above, namely, at a low temperature a long time is required while at a high temperature short reaction time suffices. Also, it is advisable to effect reaction at the boiling point of the organic solvent. For instance, where benzene is added to the aqueous solution, the reaction at 80° C. for 30 minutes is most appropriate. In other cases, where it is desired to use a solvent such as methanol, ethanol or other alcohol instead of water, the cyanide is added preferably in powdered form and the reaction preferably proceeds at the boiling point of the solvent. For instance, in the case of methanol, the reaction should be conducted at 65° C. for 1-1.5 hours.

If the quantity of cyanide used is less than the theoretical amount, $\alpha$-acetylpropionitrile cannot be obtained as mentioned above. It is advisable to use 1.5 mol or more. When the reaction is conducted in alcoholic medium, the addition of sodium alcoholate or other alkali metal alcoholate as a catalyst diminishes the quantity of cyanide required. It is preferred to use sodium cyanide as the reactant cyanide.

After the reaction has been completed, the reaction mixture may be treated in the following way: after cooling, the mixture is neutralized with hydrochloric acid, sulphuric acid or other mineral acid and the medium is kept weakly acidic. Then, in the case of aqueous medium, the mixture is extracted with ether, benzene or other organic solvents. In the case where water and benzene were both used, the benzene layer is separated. In both cases, the organic solvent is distilled off, and then $\alpha$-acetylpropionitrile is obtained by further vacuum distillation of the residue (at 78–80° C./20 mm. Hg). In the case of alcoholic medium, the reaction mixture is neutralized with mineral acid; the resulting solution is filtered to remove any separated inorganic salt; and the alcohol is distilled off, followed by vacuum distillation as described above.

In the above mentioned reaction, $\alpha$-acetylpropionitrile may be obtained similarly, by reacting cyanide in aqueous or alcoholic medium, with isolated $\alpha,\beta$-dimethylglycidonitrile which is easily obtained by equimolecular reaction of cyanide and 3-chlorobutanone-(2) in aqueous or alcoholic medium at low temperature, preferably at 10–20° C. for about one hour. Alternatively, the $\alpha,\beta$-dimethylglycidonitrile may be used as formed, without isolation, to react with cyanide in order to obtain the desired final compound. The reaction takes place in aqueous medium at a temperature of 90–100° C. in the short time of 5–10 minutes. When benzene is added to the aqueous medium, or when alcoholic medium alone is used, the reaction is carried out gently at the boiling point of the medium for ½–1 hour.

In the case of alcoholic medium, the addition of alkali-metal alcoholate diminishes the quantity of cyanides required just as in the manner mentioned above.

When isolated $\alpha,\beta$-dimethylglycidonitrile is used as a reactant, besides the above mentioned conditions of reaction, inorganic bases such as hydroxides of alkali metals or alkaline earth metals, alkali carbonates, metal cyanides, organic bases such as pyridine, metal alcoholates, or organic acids such as acetic acid may be used; the reaction mixture is heated, possibly in the presence of water or organic solvent, and the starting material is converted into $\alpha$-acetylpropionitrile. The reaction temperature should be, in case of using solvent, the boiling point of that solvent, and in case of no solvent, higher than that, preferably at 100° to 150° C.

Further, from 2 - cyano - 2 - hydroxy - 3 - chlorobutane which is easily obtained by adding hydrogen cyanide to 3-chlorobutanone-(2), or by adding hydrogen chloride to $\alpha,\beta$-dimethylglycidonitrile, $\alpha$-acetylpropionitrile may be obtained by means of cyanides, as in the case of 3-chlorobutanone-(2). This reaction is formularized as follows:

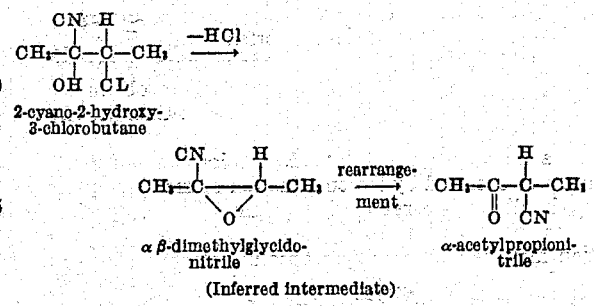

(Inferred intermediate)

The following examples are given simply to illustrate our invention but not in any way to limit its scope. "Parts" mentioned therein represents ratio of weight.

*Example 1*

To the aqueous solution of 22 parts of sodium cyanide and 40 parts of water, 20 parts of 3-chlorobutanone-(2) are added dropwise, under cooling with ice, and reaction is conducted at 10–20° C. for one hour. Afterwards, the temperature is raised and reaction is continued for 10 minutes at 90–100° C. Then, after adding 40 parts of cold water, the reaction mixture is neutralized with sulphuric acid, under cooling from outside. Afterwards, the mixture is extracted with ether, and after distilling ether off, 7.5 parts of $\alpha$-acetylpropionitrile, which distills at 78–80° C./20 mm. Hg, are obtained by vacuum distillation. The yield is 41.1% based on 3-chlorobutanone-(2).

*Example 2*

To the aqueous solution of 22 parts of sodium cyanide and 40 parts of water, 20 parts of benzene and 0.4 part of Turkey red oil are added, and under cooling with ice, 20 parts of 3-chlorobutanone-(2) are added dropwise, and the reaction is conducted at 10–20° C. for one hour. Afterwards, the temperature is raised to 80° C. and the reaction is continued for about 30 minutes. Then, adding 40 parts of cold water, the mixture is neutralized with sulphuric acid, under cooling from outside. Afterwards, the benzene layer is separated and benzene is distilled off. Then the residue is treated as in Example 1, and 7 parts of $\alpha$-acetylpropionitrile are obtained. The yield is 38.4% based on 3-chlorobutanone-(2).

*Example 3*

To the aqueous solution of 122.5 parts of sodium cyanide and 245 parts of water, 106.4 parts of 3-chlorobutanone-(2) are added dropwise under cooling with ice. Afterwards, the mixture is heated to 90–100° C. where it is kept for 15 minutes. Then 250 parts of cold water are added, and the mixture is neutralized with sulphuric acid, under cooling from outside. Afterwards, the product is treated as in Example 1 and 31 parts of α-acetylpropionitrile are obtained. The yield is 32% based on 3-chlorobutanone-(2).

Example 4

To the aqueous solution of 10 parts of sodium cyanide and 20 parts of water, 20 parts of 3-chlorobutanone-(2) are added dropwise, under cooling with ice. Afterwards, the reaction is performed at 10–20° C. for one hour. Then, the aqueous solution of 12 parts of sodium cyanide and 24 parts of water is added, and the temperature is raised to 90–100° C. where the reaction is continued for 10 minutes. Thereafter, 40 parts of water are added, and the mixture is neutralized with sulphuric acid, under cooling from outside. Afterwards, the product is treated as in Example 1 and 7.3 parts of α-acetylpropionitrile are obtained. The yield is 40% based on 3-chlorobutanone-(2).

Example 5

To 80 parts of methanol, 21 parts of powdered sodium cyanide are added, and 20 parts of 3-chlorobutanone-(2) are brought into the mixture by stirring, while maintaining the mixture at 65° C., and the reaction is conducted for one hour. Afterwards, the reaction mixture is neutralized with sulphuric acid under cooling. After filtration, methanol is distilled off from the filtrate. Then, the residue is treated in the similar way as mentioned above and 8.9 parts of α-acetylpropionitrile are obtained. The yield is 48.8% based on 3-chlorobutanone-(2).

Example 6

To 80 parts of methanol, 13.8 parts of powdered sodium cyanide and 20 parts of 3-chlorobutanone-(2) are added, and 11.1 parts of sodium alcoholate are brought dropwise into the mixture by stirring, and the reaction is continued for one hour at 65° C. Thereafter, the product is treated as in Example 5, and 8.8 parts of α-acetylpropionitrile are obtained. The yield is 48.3% based on 3-chlorobutanone-(2).

Example 7

To the aqueous solution of 59 parts of sodium cyanide and 118 parts of water, 97 parts of α,β-dimethylglycidonitrile are added. The mixture is heated at about 90° C. causing rapid reaction. After the reaction is continued for 5–10 minutes, 100 parts of cold water are added, and the reaction mixture is neutralized with sulphuric acid, under cooling, and extracted with ether. After ether is distilled off, the residue is treated similarly as mentioned above and 50.4 parts of α-acetylpropionitrile are obtained. The yield is 52% based on α,β-dimethylglycidonitrile.

Example 8

To the aqueous solution of 59 parts of sodium cyanide and 118 parts of water, 100 parts of benzene, 2 parts of Turkey red oil and 97 parts of α,β-dimethylglycidonitrile are added, and the mixture is allowed to react at 80° C., for 30 minutes. Then, 100 parts of water are added, and the mixture is neutralized with sulphuric acid, under cooling. After the benzene layer is separated and benzene is distilled off, 44.6 parts of α-acetylpropionitrile are obtained by the similar treatment as mentioned above. The yield is 46% based on α,β-dimethylglycidonitrile.

Example 9

To 80 parts of absolute ethanol, 11 parts of powdered sodium cyanide are added; the mixture is stirred and maintained at 80° C.; then, 20 parts of α,β-dimethylglycidonitrile are added dropwise. After the reaction is continued for one hour, the reaction mixture is treated as in Example 5, and 9.6 parts of α-acetylpropionitrile are obtained. The yield is 48% based on α,β-dimethylglycidonitrile.

Example 10

The aqueous solution of 11 parts of sodium carbonate and 25 parts of water is heated to about 90° C., 20 parts of α,β-dimethylglycidonitrile are added to it, and the mixture is allowed to react at 95–100° C. for 30 minutes. Afterwards, the mixture is neutralized with sulphuric acid, under cooling, and extracted with ether; the ether layer is separated and ether is distilled off. Thereafter, the distillation residue is treated as in the previous example and 6 parts of α-acetylpropionitrile are obtained. In this case, 5 parts of raw material are recovered. The yield is 40% based on α,β-dimethylglycidonitrile (taking into consideration the recovery of raw material).

Example 11

To 25 parts of α,β-dimethylglycidonitrile, 10 parts of calcium hydroxide are added and the mixture is allowed to react at 140–150° C. for five hours. Then 6.8 parts of α-acetylpropionitrile are obtained by vacuum distillation. In this case, 2.6 parts of raw material are recovered. The yield is 30.3% based on α,β-dimethylglycidonitrile (taking into consideration the recovery of raw materials).

Example 12

To 30 parts of α,β-dimethylglycidonitrile, 3 parts of pyridine are added and the mixture is allowed to react at 130–145° C. for one hour. Then 4.7 parts of α-acetylpropionitrile are obtained by the vacuum distillation. The yield is 15.6% based on α,β-dimethylglycidonitrile.

Example 13

To 133 parts of 2-cyano-2-hydroxy-3-chlorobutane, 400 parts of ethanol are added. To this mixture, an aqueous solution consisting of 108 parts of sodium cyanide and 300 parts of water is added, and the mixture is allowed to react at room temperature for three hours and then at 80° C. for 30 minutes. After ethanol is distilled off, the reaction mixture is neutralized with sulphuric acid, under cooling and extracted with ether. After ether is distilled off, the residue is treated in the similar way as mentioned above, and 34 parts of α-acetylpropionitrile are obtained. The yield is 35% based on 2-cyano-2-hydroxy-3-chlorobutane.

Whereas the present invention has been described with particular reference to the examples included herein, other modifications apart from those described or suggested herein may be made within the spirit of this invention.

We claim:

1. The process for preparing α-acetylpropionitrile, which comprises reacting 3-chlorobutanone-(2) with an aqueous solution containing more than an equimolar amount of an alkali metal cyanide at a temperature between 35 and 100° C.

2. The process for preparing a-acetylpropionitrile, which comprises reacting at a temperature between 35 and 100° C. 3-chlorobutanone-(2) with an aqueous solution containing at least about 1.5 moles of an alkali metal cyanide per mole of chlorobutanone.

3. The process of claim 2, wherein a water-immiscible solvent is also present, the α-acetylpropionitrile entering the water-immiscible solvent phase.

4. The process for preparing α-acetylpropionitrile, which comprises reacting at a temperature between 35 and 100° C. 3-chlorobutanone-(2) with at least about 1.5 times the molar amount of an alkali metal cyanide in the presence of an alcohol as solvent.

5. The process of claim 4, wherein the alcohol solvent is methanol.

6. The process of claim 4, wherein an alkali metal alcoholate is also present in the course of the reaction.

7. The process for preparing α-acetylpropionitrile, which comprises contacting 3-chlorobutanone-(2) with a solution containing about 1.5 times the molar amount of an alkali metal cyanide at a temperature in excess of 35° C., approximately an equimolar amount of the cyanide being first added and the balance of the cyanide being subsequently added.

8. The process for preparing α-acetylpropionitrile, which comprises heating at a temperature of 35 to 100° C. 3-chlorobutanone-(2) with approximately an equimolar amount of an alkali metal cyanide in the presence of a solvent selected from the group consisting of an alcohol and water, thereby forming α,β-dimethylglycidonitrile, and then directly adding to the reaction mass a catalyst selected from the group consisting of inorganic basic compounds, organic basic compounds, and organic acidic compounds, whereby the dimethylglycidonitrile is rearranged to α-acetylpropionitrile.

9. The process of claim 8, wherein the rearrangement catalyst is an alkali metal cyanide.

10. The process of claim 8, wherein the rearrangement catalyst is an alkaline earth metal hydroxide.

11. The process of claim 8, wherein the solvent is an alcohol and the rearrangement catalyst is a mixture of an alkali metal cyanide and an alkali metal alcoholate.

No references cited.